(12) United States Patent
Black

(10) Patent No.: US 6,269,351 B1
(45) Date of Patent: *Jul. 31, 2001

(54) METHOD AND SYSTEM FOR TRAINING AN ARTIFICIAL NEURAL NETWORK

(75) Inventor: Christopher Lee Black, Andersonville, TN (US)

(73) Assignee: Dryken Technologies, Inc., Knoxville, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,392

(22) Filed: Mar. 31, 1999

(51) Int. Cl.$^7$ .................................................. G06F 15/18
(52) U.S. Cl. .................................. 706/15; 706/12; 706/14
(58) Field of Search .............................. 706/15, 12, 14, 706/16

(56) References Cited

U.S. PATENT DOCUMENTS

| | | | |
|---|---|---|---|
| 5,214,746 | * | 5/1993 | Fogel et al. ............................. 706/25 |
| 5,222,193 | * | 6/1993 | Brooks et al. ........................... 706/25 |
| 5,408,424 | | 4/1995 | Lo ......................................... 708/303 |
| 5,513,098 | * | 4/1996 | Spall et al. .............................. 700/38 |
| 5,734,797 | * | 3/1998 | Deangelis et al. ..................... 706/15 |
| 5,745,653 | | 4/1998 | Jesion et al. ........................... 706/23 |
| 5,761,383 | * | 6/1998 | Engel et al. ............................ 706/14 |
| 5,781,700 | * | 8/2000 | Puskorius et al. ..................... 706/14 |
| 5,812,992 | * | 9/1998 | De Vries ................................ 706/25 |
| 5,826,249 | * | 10/1998 | Skeirik ................................... 706/25 |
| 6,009,418 | * | 12/1999 | Cooper ................................... 706/15 |
| 6,032,139 | * | 2/2000 | Yamaguchi et al. ................... 706/13 |
| 6,038,555 | * | 3/2000 | Field et al. ............................. 706/21 |
| 6,047,277 | * | 4/2000 | Parry et al. ............................ 706/20 |
| 6,064,996 | * | 5/2000 | Yamaguchi et al. ................... 706/13 |
| 6,064,997 | * | 5/2000 | Jagannathan et al. ................. 706/23 |
| 6,119,111 | * | 8/2000 | Gross et al. ............................ 706/15 |

OTHER PUBLICATIONS

Bond et al, "Neural network analysis of nondestructive evaluation pattersns", ACM pp. 643–650, 1992.*
Nasereddin et al, "The development of a methodology for the use of neural network and simulation modling in system design", Proc. of winter simulation conf. ACM pp. 537–542, 1999.*
Skomorokhov "Adaptive learning networks in APL2", ACM APL Quote quad, pp. 219–229, Mar. 1993.*
Barreto, "Neural network learning: a new programming paragidm", ACM pp. 434–446, 1990.*

* cited by examiner

*Primary Examiner*—Mark R. Powell
*Assistant Examiner*—Anil Khatri
(74) *Attorney, Agent, or Firm*—Christopher J. Rourk; Akin Gump Strauss Hauer & Feld, L.L.P.

(57) ABSTRACT

A method and system for training an artificial neural network ("ANN") are disclosed. One embodiment of the method of the present invention initializes an artificial neural network by assigning values to one or more weights. An adaptive learning rate is set to an initial starting value and training patterns for an input layer and an output layer are stored. The input layer training pattern is processed in the ANN to obtain an output pattern. An error is calculated between the output layer training pattern and the output pattern and used to calculate an error ratio, which is used to adjust the value of the adaptive learning rate. If the error ratio is less than a threshold value, the adaptive learning rate can be multiplied by a step-up factor to increase the learning rate. If the error ratio is greater than the threshold value, the adaptive learning rate can be multiplied by a step-down factor to reduce the learning rate. The value of the weights used to initialize the ANN are adjusted based on the calculated error and the adaptive learning rate. The training method of the present invention is repeated until ANN achieves a final trained state.

20 Claims, 7 Drawing Sheets

EXAMPLE SAMPLING DISTRIBUTION
FOR WEIGHT JOGGING

RESULTS OF TWO SUCCESSIVE
WEIGHT JOGGING TRIALS

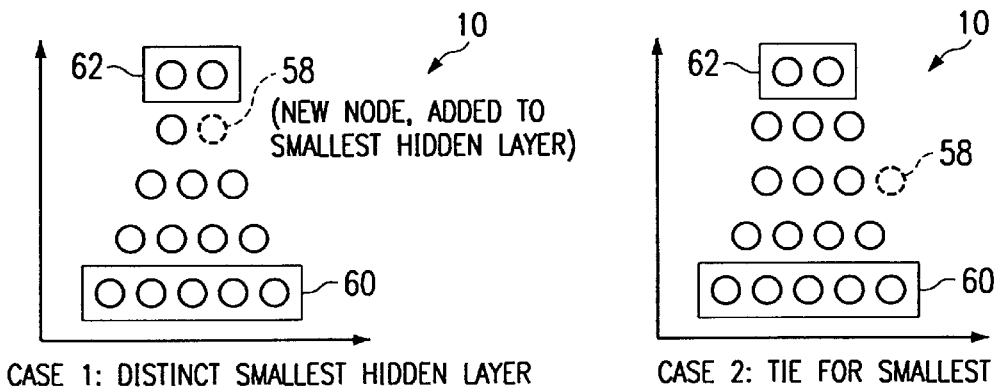
FIG. 10A  CASE 1: DISTINCT SMALLEST HIDDEN LAYER
FIG. 10B  CASE 2: TIE FOR SMALLEST
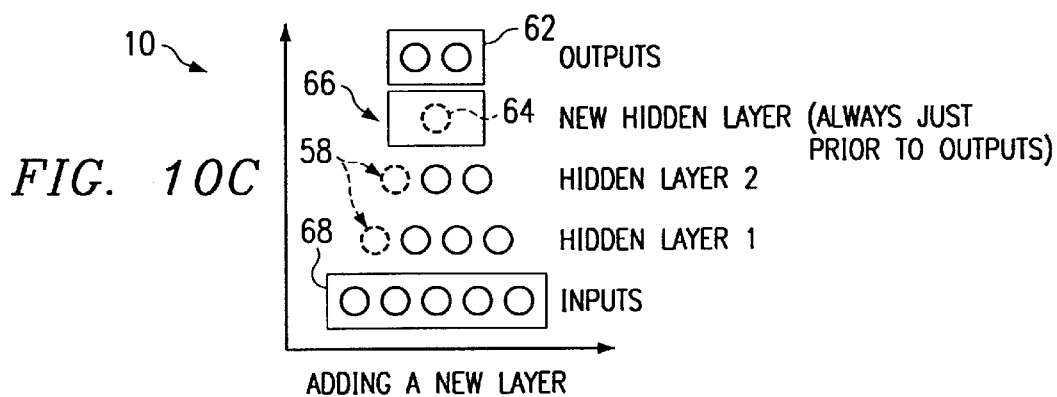
FIG. 10C  ADDING A NEW LAYER
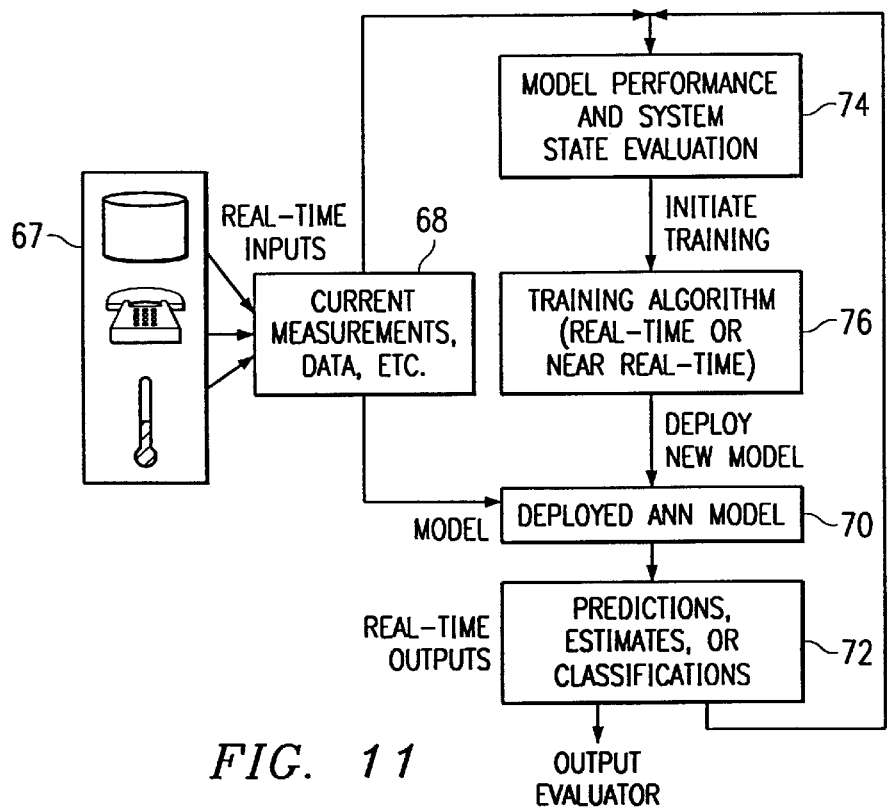
FIG. 11

METHOD AND SYSTEM FOR TRAINING AN ARTIFICIAL NEURAL NETWORK

TECHNICAL FIELD OF THE INVENTION

The present invention relates generally to neural network training systems and their operation. More particularly, the present invention relates to an improved neural network training method and system having the ability to change its learning rate in response to training performance, to automatically select a representative training dataset, to reinitialize the neural network to achieve a preset error goal, and to automatically optimize the neural network size for a given training dataset.

BACKGROUND OF THE INVENTION

Artificial neural networks ("ANNs") are well known in the prior art. The role of an ANN is to perform a non-parametric, nonlinear, multi-variate mapping from one set of variables to another. ANN 10 of FIG. 1 illustrates such a mapping by operating on input vector 12 to produce output vector 14. To perform this mapping, a training algorithm is applied to deduce the input/output relationship(s) from example data. Such ANN training algorithms are also well known in the prior art.

Prior to training, an ANN is initialized by randomly assigning values to free parameters known as weights. The training algorithm takes an unorganized ANN and a set of training input and output vectors and, through an iterative process, adjusts the values of the weights. Ideally, by the end of the training process, presentation of a vector of inputs from the training data to the ANN results in activations (outputs) at the output layer that exactly match the proper training data outputs.

The basic unit that makes up an artificial neural network is variously known as an artificial neuron, neurode, or simply a node. As depicted in FIG. 2, each ANN node 16 has a number of variable inputs 15, a constant unity input 19 (also known as a bias or a bias input), and an output 17. The variable inputs correspond to outputs of previous nodes in the ANN. Each input to a node, including the bias, is multiplied by a weight associated with that particular input of that particular node. All of the weighted inputs are summed. The summed value is provided to a nonlinear univariate function known as a transfer or squashing function. The purpose of a squashing function is two-fold: to limit (threshold) the magnitude of the activation (output) achievable by each node, and to introduce a source of non-linearity into the ANN. The most commonly applied transfer functions for continuous mappings include the hyperbolic tangent function or the sigmoid function, which is given below:

$$\phi(x) = \frac{1}{1 + e^{-\alpha x}}. \quad \text{Equation (1)}$$

As expressed in Equation 2 below, $x_j^k$, the output of node number j belonging to a layer k, is simply the transfer function $\phi$ evaluated at the sum of the weighted inputs.

$$x_j^k = \phi\left(\sum_{i=0}^{n} w_{ij} x_i^{k-1}\right). \quad \text{Equation (2)}$$

In equation (2) $X_i^{k-1}$ is the activation of node number i in the previous layer, $w_{ij}$ represents the weight between node j in the k-th layer and node i in the previous layer, and $\phi$ represents the transfer function.

A basic feedforward artificial neural network incorporates a number of nodes organized into layers. Most feedforward ANNs contain three or more such layers. An example ANN is illustrated in FIG. 3. ANN 10 consists of an input layer 18 communicatively connected to one or more hidden layers 20. Hidden layers 20 can be communicatedly connected to one another, to input layer 18 and to output layer 22. All layers are comprised of one or more nodes 16. Information flows from left to right, from each layer to the next adjacent layer.

The nodes in the input layer are assigned activation values corresponding to the input variables. The activation of each of these nodes is supplied as a weighted input to the next layer. In networks involving three or more layers, the interior layers are known as hidden layers. After one or more hidden layers, the final layer, known as the output layer, is reached. The activations of the nodes of the output layer correspond to the output variables of the mapping.

The interior layers of the network are known as hidden layers to distinguish them from the input and output layers whose activations have an easily interpretable relationship with something meaningful. The hidden layers perform an internal feature detection role, and thus harbor an internal representation of the relationships between the inputs and outputs of the mapping, but are usually not of use to and are generally "hidden" from the attention of the user.

As previously mentioned, transfer functions help the mapping by thresholding the activations of nodes. This is desirable as it forces the ANN to form distributed relationships and does not allow one or a few nodes to achieve very large activations with any particular input/output patterns. These requirements and restrictions upon the behavior of the ANN help to ensure proper generalization and stability during training and render the ANN more noise-tolerant. However, a consideration raised by transfer functions is that they generally cause ANN outputs to be limited to the ranges [0,1] or [1,1]. This necessitates a transformation to and from the ranges of the output variables and the transfer function. In practice, a network is trained with example inputs and outputs linearly scaled to the appropriate range—just within the tails of the transfer function. When the network is deployed, the inputs are again scaled, but the outputs of the network are usually "descaled" by applying the inverse of the scaling function. The de-scaling provides real-world units and values to the otherwise unit-less fractional values generated by the ANN.

When a network is generated or initialized, the weights are randomly set to values near zero. At the start of the ANN training process, as would be expected, the untrained ANN does not perform the desired mapping very well. A training algorithm incorporating some optimization technique must be applied to change the weights to provide an accurate mapping. The training is done in an iterative manner as prescribed by the training algorithm. The optimization techniques fall into one of two categories: stochastic or deterministic.

Stochastic techniques include simulated annealing and genetic-algorithms and generally avoid all learning instabilities and slowly locate a near global optimum (actually a minimum in the error surface) for the weights. Deterministic methods, such as gradient descent, very quickly find a minimum but are susceptible to local minima. Whichever category of optimization is applied, sufficient data representative of the mapping to be performed must be selected and supplied to the training algorithm.

Training data selection is generally a nontrivial task. An ANN is only as representative of the functional mapping as the data used to train it. Any features or characteristics of the mapping not included (or hinted at) within the training data will not be represented in the ANN. Selection of a good representative sample requires analysis of historical data and trial and error. A sufficient number of points must be selected from each area in the data representing or revealing new or different behavior of the mapping. This selection is generally accomplished with some form of stratified random sampling, i.e., randomly selecting a certain number of points from each region of interest.

Most training algorithms for feedforward networks incorporate one form or another of a gradient descent technique and collectively are known as back-propagation training. The term back-propagation describes the manner in which the error gradient calculation propagates through the ANN. The expression for the prediction error $\delta_j$ at some node J in the output layer is simply the difference between the ANN output and the training data output.

$$\delta_j^{output} = X_j^{desired} - X_j^{output} \qquad \text{Equation (4)}.$$

The expression for the error at some node i in a previous (to the output) layer may be expressed in terms of the errors at the subsequent nodes to which node i is connected.

$$\delta_i^k = x_i^{k+1}(1 - x_i^k) \sum_j \delta_j^{k+1} \omega_{ij}^{k+1}. \qquad \text{Equation (5)}$$

These error terms, along with neuron activations throughout the net and an additional training parameter α called the learning rate (which takes a positive value generally less than unity), provide the necessary information to adjust the weights throughout the ANN. The following expression for the weight update between node i in one layer and node j in the next is known as the general delta rule (GDR).

$$\Delta w_{ij}^{k+1} = \alpha \, \delta_j^{k+1} x_i^k. \qquad \text{Equation (6)}$$

The weights throughout the network are updated as above each time a training pattern is presented to the ANN. To avoid learning instabilities when different patterns are pulling the weights back and forth, and also to generally converge faster, the cumulative delta rule (CDR) is frequently employed. The CDR uses the same expression for the weight update as the GDR, but all weight updates are accumulated and implemented at the same time each time the entire training dataset is presented to the ANN.

In order to help avoid learning instabilities known as local minima, which are concave areas on the weight surface where the gradient goes to zero, a term is usually added to either the general or cumulative delta rule that sometimes helps carry the weights outside the local minima. The resultant expression, equation (7) below, is called the general or cumulative delta rule with momentum. The parameter β associated with the momentum term is set to a value of (0,1) and is referred to simply as the momentum.

$$\Delta w_{ij}^{k+1}(t) = \delta_j^{k+1} x_i^k + \beta \Delta w_{ij}(t+1) \qquad \text{Equation (7)}.$$

The back-propagation learning rules expressed above must be applied many times in the weight optimization process. Sometimes the value of the learning rate is not held constant throughout the training but is instead allowed to vary according to a schedule. For example, for the first 10,000 presentations of the training dataset, α might be set to 1. This corresponds to the ANN taking bold steps through the weight space. For the next 10,000 presentations, α might be set to 0.7. As the ANN trains, the reduction continues and the ANN takes more timid and refined steps. This learning rate schedule assumes that large steps are appropriate at the start of training and that very small steps help find the very bottom of the local area at the end of training.

SUMMARY OF THE INVENTION

Therefore, a need has arisen for an artificial neural network training method and system having an adaptive learning rate with the capability to take progressively larger or smaller steps in a subsequent training iteration based on the error in previous training iterations.

A further needs exists for a method and system for training an artificial neural network having the capability to quickly and efficiently minimize prediction error without the susceptibility to local minima in the error surface experienced by current neural network training systems and methods.

A still further need exists for a neural network training method and system that can automatically select a representative training dataset from among a large group of data records and adaptively increase the size of the training dataset as needed to better represent the system being modeled. In the event the training method achieves an intermediate error goal with respect to the representative training dataset but does not achieve the intermediate error goal with respect to the remainder of the data records, the training method can add additional representative data records to the training dataset. Once the intermediate error goal is achieved with the entire set of data records, a lower error goal can be set and the method repeated until the error goal corresponds with the training termination criteria. This method of adaptive representative data selection during training results in fast learning, balanced, and more accurate artificial neural networks. As a result, training data requirements are generally only a fraction of percent of those necessary with existing systems and methods for training artificial neural networks.

An even further need exists for an artificial neural network training method and system that can automatically optimize the architectural characteristics of a neural network to increase training efficiency by adaptively adding nodes and layers during the training process. Additional nodes and layers can be added when the neural network training method and system fails to accomplish a predetermined error goal.

Further still, a need exists for a multiply connected artificial neural network that can automatically create more sophisticated hierarchies and hybrid artificial neural network systems without the need for a dedicated ANN researcher to train and tune individual artificial neural networks.

In accordance with the present invention a method and system for training an artificial neural network is provided that substantially eliminates or reduces disadvantages and problems associated with previously developed artificial neural network training methods and systems, including the problems of extensive training expert support, susceptibility to local minima in the error surface, non-adaptive learning rates, inefficient training dataset selection and non-optimal neural network size.

More specifically, the present invention provides a method and system for training an artificial neural network with a training algorithm having an adaptive learning rate. The method of the present invention initializes an artificial neural network by assigning random values to one or more weights. An adaptive learning rate is set to an initial starting value and training patterns for an input layer and an output layer are stored in the artificial neural network. The training method of the present invention processes the input layer training patterns in the ANN to obtain output patterns. An error is calculated between the output layer training patterns and the output patterns. Based on this error a new value for the adaptive learning rate is calculated. The method of the present invention calculates an error ratio equal to the ratio of the output pattern error of a current processing iteration to the output pattern error of the immediately preceding processing iteration.

Following the first iteration the error ratio is undefined and the adaptive learning rate is left unchanged. However, in subsequent iterations if the error ratio is less than a predetermined threshold value, the adaptive learning rate can be multiplied by a step-up factor to increase the learning rate. If the error ratio is greater than the threshold value then the adaptive learning rate can be multiplied by a step-down factor to reduce the learning rate. The value of the weights used to initialize the ANN are adjusted based on the calculated error and the adaptive learning rate. The training method of this embodiment of the present invention is repeated until the ANN reaches a final trained state.

An alternative embodiment of the ANN training method and system of the present invention provides a hybrid training algorithm incorporating aspects of both deterministic and stochastic optimization techniques. This alternative embodiment incorporates an adaptive learning rate which can be reset to a new initial value upon the training algorithm reaching a local minimum in the error surface. If a local minimum is reached, the method of this alternative embodiment of the present invention creates several sets of new weights by adding a small random change to the values of the weights used to first initialize the ANN and creates several new prospective neural networks that can be initialized with one of these new sets of weights. An input training pattern is processed through each of the initialized new prospective neural networks using the new value for the adaptive learning rate. The input training pattern is processed for a preset number of iterations to determine which of the new prospective neural networks resulted in the least error.

The method of this embodiment of the present invention replaces the original neural network with the new prospective neural network that resulted in the least error. If the new neural network falls into the same minimum, the training method of this embodiment of the present invention repeats with a greater number of prospective networks generated from a wider distribution. If after a set number of repetitions the replacement neural network continues to fall into the same minimum in the error surface, the weights and the adaptive learning rate are reinitialized and the training algorithm is processed anew.

Yet another embodiment of the present invention provides a method and system for selecting and processing a representative training dataset from a group of data records. The method of this embodiment of the present invention adaptively increases the size of the training dataset during training if the training algorithm fails to reach an intermediate error goal with respect to the entire set of data records. Once the intermediate error goal is reached with respect to the entire data record set, a lower error goal is set and the training algorithm is repeated until the set error goal corresponds to the final training state criteria for the neural network.

A still further embodiment of the present invention provides a system and method for automatically optimizing the architecture of an artificial neural network by adaptively adding nodes and layers during the training process. Automated optimization is accomplished by adding nodes and layers during the training process when learning progress has stalled. Nodes are added first to the smallest layer of the ANN. In the event of a tie for smallest layer, the smallest layer closest to the input layer gets the new node. After several nodes have been added, a hidden layer of one node can be added just prior to the output layer. The ANN weights are reindexed appropriately after each node or layer addition so that all nodes receive the same inputs and play the same roles in the mapping. The method of this embodiment of the present invention can create several new nodes and/or several new layers and choose the best candidate from among them (i.e., the one that results in the least error).

As a technical advantage the method of the present invention provides a neural network training method and system having an adaptive learning rate with the capability to take progressively larger or smaller training steps in subsequent training iterations based on the error encountered in previous training iterations.

Another technical advantage of the present invention is that it provides an ANN training method having the capability to quickly and efficiently minimize prediction error in the neural network output with less susceptibility to local minima in the error surface than current ANN training methods.

A further technical advantage of the present invention is that it provides an ANN training method and system that can automatically select a representative training dataset from among a group of data records and adaptively increase the size of the training dataset to achieve a desired error goal. This method of adaptive representative data selection during training results in a fast-learning, balanced, and more accurate artificial neural network having training data requirements only a fraction of a percent of that necessary with existing neural network training systems and methods.

A still further technical advantage of the present invention is that it provides a neural network training method and system that can increase training efficiency by automatically optimizing the architectural characteristics of an ANN by adaptively adding nodes and layers to the neural network during the training process.

Still another technical advantage of the present invention is that it provides for a multiply-connected artificial neural network that can automatically create sophisticated hierarchies and hybrid artificial neural network systems without the need for a dedicated neural network researcher to train and tune individual artificial neural networks.

BRIEF DESCRIPTION OF THE DRAWINGS

A more complete understating of the present invention and the advantages thereof may be acquired by referring to the following description, taken in conjunction with the accompanying drawings in which like reference numbers indicate like features and wherein:

FIGS. 10A, 10B, and 10C illustrate the adaptive node and layer adding capability of an embodiment of this invention;

FIG. 11 illustrates a possible deployment of the artificial neural network training method of an embodiment of this invention in a real-time system;

DETAILED DESCRIPTION OF THE INVENTION

Preferred embodiments of the present invention are illustrated in the figures, like numerals being used to refer to like and corresponding parts of various drawings.

The present invention provides the capability for using an adaptive learning rate in a neural network training algorithm. An adaptive learning rate allows an artificial neural network to automatically take the correct size steps throughout a training process. The ANN can thereby reach a final trained state orders of magnitude faster than with a learning schedule or constant learning rate such as those used in current artificial neural network training methods and systems.

The present invention additionally provides the capability to "jog" the weights used in training an artificial neural network to avoid local minima. By using a hybrid optimization/training algorithm incorporating aspects of both stochastic and deterministic training methods, the present invention can provide both the speed of the deterministic techniques (such as backpropagation) and the resistance to local minima of stochastic techniques (such as simulated annealing).

Furthermore, the present invention provides the capability for automatically and rapidly selecting a representative training dataset from a group of data records (which can be a quite large group) to increase the training efficiency of the neural network. The present invention can also automatically optimize the architecture of the neural network by adaptively adding nodes and layers during the training process as required to increase the training speed and precision.

Figure 1:
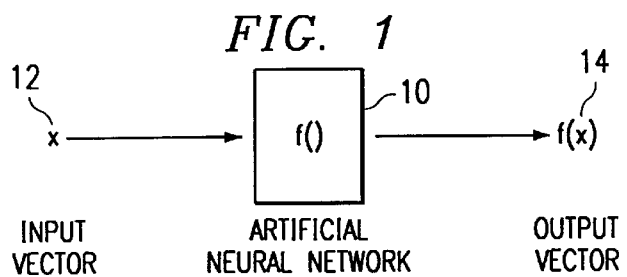
FIG. 1 is a simplified block diagram representation of an artificial neural network.
Figure 2:
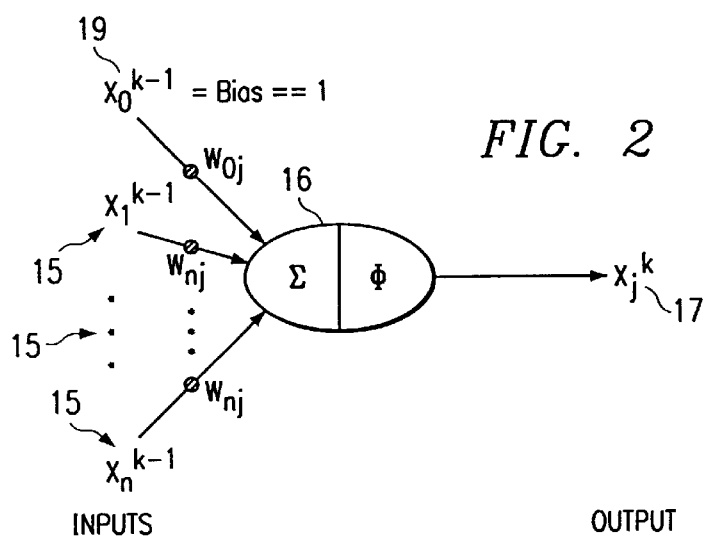
FIG. 2 is a simplified representaion of an artificial neural network node.
Figure 3:
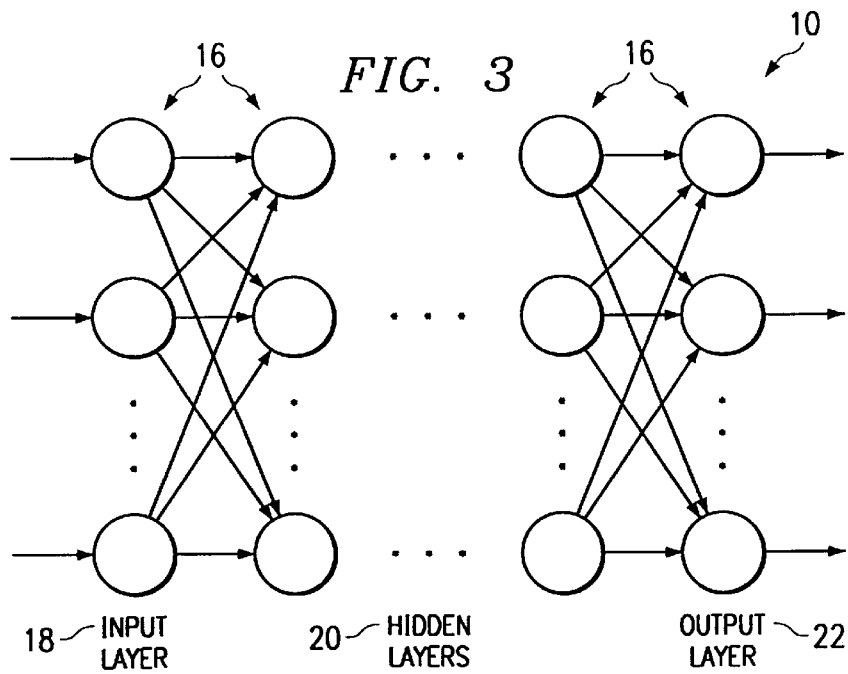
FIG. 3 is an expanded view of an artificial neural network showing individual nodes and layers.

FIG. 1 is a block diagram view of an artificial neural network 10 receiving as an input "x" input vector 12 and outputting f(x) output vector 14. The role of artificial neural network 10 is to perform a non-parametric, non-linear multivariate mapping from one set of variables (inputs) to another (outputs). Output vector 14 is the result of the mapping performed on input vector 12 by artificial neural network 10.

The training algorithm applied within artificial neural network 10 is comprised in part of a parameter called the learning rate. The learning rate usually takes a positive value, generally near or less than unity, and determines the rate at which training steps are taken as the training algorithm trains ANN 10. One embodiment of the ANN training method of this invention incorporates an adaptive learning rate to increase the training efficiency of ANN 10. An adaptive learning rate allows ANN 10 to reach a final trained state orders of magnitude faster than with using a constant learning rate or presuming in advance of training what the learning rate needs to be during a particular training iteration (a training schedule).

The mechanism for adaptive learning rate adjustment is a simple heuristic—"if progress is being made with the current learning rate, then take slightly larger steps, else take smaller steps." Thus, if the error of the outputs is either smaller, is the same as, or is even slightly larger than the error of the outputs prior to the last weight update, then the ANN training method of the present invention can multiply the learning rate by a step-up factor slightly larger than one (for example, 1.1). If, on the other hand, the ratio of the error at the outputs of the present interation and the previous interation, known as the error ratio, exceeds a threshold value slightly larger than one (e.g., 1.05), the method of the present invention multiplies the learning rate by a step-down factor slightly less than one (for example, 0.9).

This heuristic allows ANN 10 to automatically take the correct size training steps throughout the training process. ANN 10 thereby reaches a final trained state orders of magnitude faster than with a learning schedule or constant learning rate. In addition to arriving at a final trained state faster, the adaptive learning rate also can usually reach a much lower error than might be obtained otherwise. An adaptive learning rate allows the network to avoid many learning instabilities that the constant or scheduled learning rate delta rules (with or without momentum) do not address. These instabilities include relatively flat spots, inclined valleys, and saddle points on the error surface. Also, it is fairly easy to envision situations in multiple dimensions where a small learning rate is necessary to wriggle through a tight spot or hole in the error surface, only to emerge on a long slope or other arrangement where a larger learning rate is then appropriate.

Figure 4:
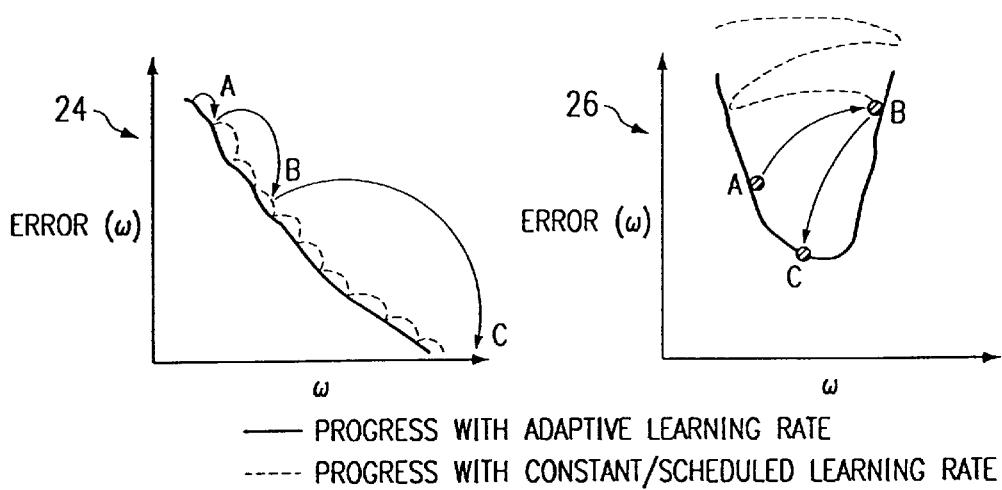
FIG. 4 is a graphical comparison of the training progress achieved with and without the adaptive learning rate of one embodiment of the present invention.

FIG. 4 consists of graph 24 and graph 26 that illustrate how the adaptive learning rate of this embodiment of this invention is superior to a constant or scheduled (step-wise constant) learning rate. Graph 24 shows, in dashed lines, the training progress with a constant (or a scheduled) learning rate. Graph 24 also shows, in solid lines, training progress with the adaptive learning rate of the ANN training method of this invention. Graph 24 illustrates one of many possible occasions when a large step-size through the weight space is appropriate.

The ability of the adaptive learning rate of the ANN training method of this invention to more quickly reach a minimuma is demonstrated on the inclined error surface shown in graph 24 of FIG. 4. The constant or scheduled learning rate takes small, predetermined steps that result in a steady but slow progression to the minimum of the error surface. Such inefficiently small steps lead to inappropriately many training iterations. By contrast, the adaptive learning rate of the ANN training method of this invention can adjust and take short or long strides.

At an early iteration, a small step is taken terminating at point A. The heuristic of the method of this invention determines that the current learning rate is making progress (i.e., the error is becoming smaller) as shown by the decreasing slope of the error surface in graph 24. Therefore, during the next iteration, the training method of this invention takes a larger step, terminating at point B. The heuristic of the training method of this invention determines at Point B that progress is still being made and in the next iteration takes a still larger step, terminating at point C. The adaptive learning rate of the training method of this invention takes a significantly smaller amount of steps to reach the same minima in the error surface much more quickly than with the constant or scheduled learning rate. The adaptive learning rate therefore allows the ANN to be trained much more quickly.

Graph 26 of FIG. 4 illustrates a possible situation where a constant step-size learning rate can oscillate in an inefficient periodic, or even unstable, fashion. By contrast, the adaptive learning rate of the ANN training method of this invention deduces when the current step-size is inappropriate (for example, when jumping over finer scaled details in the error surface) and reduces the step-size to quickly home in the bottom of the minimum (which is hopefully the global minimum).

The constant or scheduled learning rate of the prior art zigzags back and forth between opposite sides of the valley in the error surface, taking a large number of steps from one side to the other before coming to the minimum. By contrast, the adaptive learning rate of this invention takes a step from point A to point B and determines as part of the heuristic that the amount of error has increased. The ANN training method of this invention multiplies the learning rate by a value slightly less than one to decrease the learning rate and bring predictions back to point C on the error surface, much closer to the bottom of the minimum. By the same technique shown in graph 24 of FIG. 4, the method of this invention uses the adaptive learning rate to more quickly and more efficiently reach the minimum in the error surface.

Although FIG. 4 is only two-dimensional, the situation shown extends to multiple dimensions, where an adaptive learning rate is even more useful. If the error surface were, for example, a three-dimensional bob-sled run shape, a naive algorithm would bounce side to side and not proceed down the run. The adaptive learning rate of this embodiment of the present invention, however, quickly settles down and zooms off down the run. In N-dimensions, an adaptive learning rate is even more critical to efficiency.

Two variations of the adaptive learning rate heuristic of the ANN training method of this invention are utilized, as each enjoys advantages over the other in different circumstances. In one version, weight changes that could increase the error ratio more than the error ratio threshold limit (used as a threshold to adjust the learning rate) are accepted, resulting in a more freely roaming and less stable training algorithm. While this is sometimes useful, it is also useful to have a faster and more stable conversion. Therefore, the second variation of the heuristic does not allow such weight changes.

Figure 5:
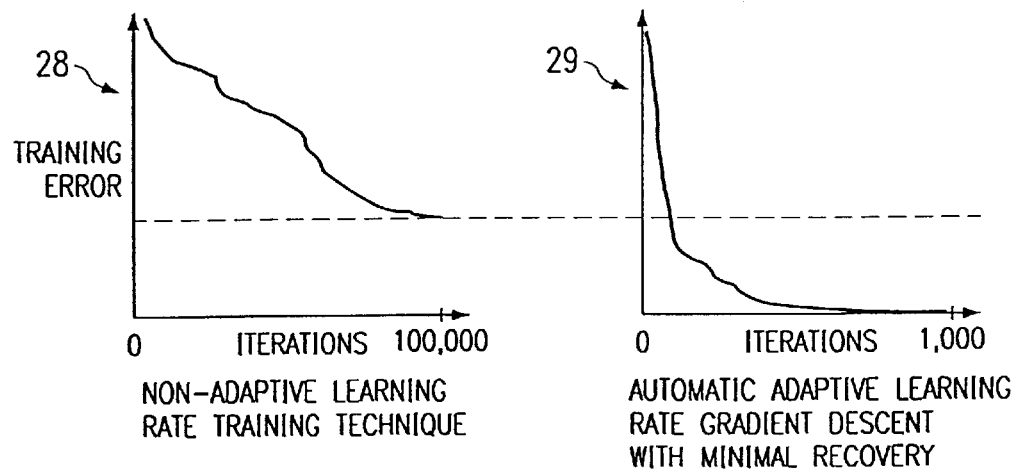
FIG. 5 is a graphical comparison illustrating the measurable benefits of the adaptive learning rate of an embodiment of this invention.

FIG. 5 illustrates how the adaptive learning rate of the ANN training method of this invention translates into measurable benefits. FIG. 5 consists of graphs 28 and 29 that show the capability of a training algorithm incorporating an adaptive learning rate to reach a final training state orders of magnitude faster than a learning algorithm incorporating a training schedule or constant learning rate. Graphs 28 and 29 also demonstrate the ability of the method of this invention to reach a much lower error.

Graph 28 shows a non-adaptive learning rate training technique. The dashed line running through graphs 28 and 29 represents the desired error goal. As can be seen in graph 28, after 100,000 iterations of the non-adaptive learning rate training technique, the specified error goal is reached. To do so, however it takes a great number of training iterations and the specified error goal is reached in a relatively constant but slow progression.

By contrast, graph 29 shows an automatic adaptive learning rate gradient descent technique (also incorporating minima recovery, which will be discussed as part of another embodiment of the method of this invention). As shown in graph 29 the training progression of the adaptive learning rate reaches the same specified error goal as in graph 28 after only a small number of iterations. Furthermore, the adaptive learning rate of the ANN training technique of this invention, after only approximately 1,000 iterations (orders of magnitude less than the non-adaptive training technique), reaches a much smaller final error. The adaptive learning rate of the ANN training method of this invention thus results in much higher prediction accuracy and much faster error goal achievement.

Figure 6:
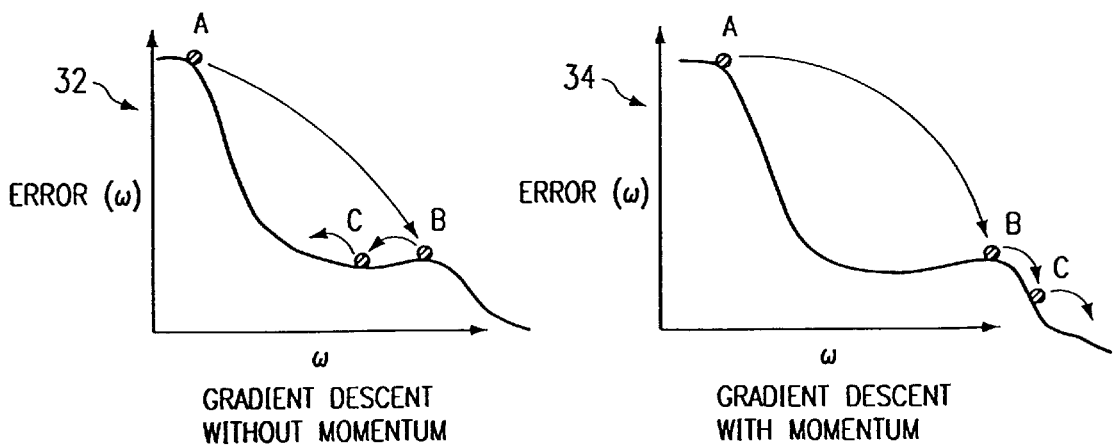
FIG. 6 is a graphical comparison of a gradient descent technique incorporating momentum versus the same technique without momentum.

FIG. 6 illustrates the behavior of gradient descent based training techniques (such as back propagation) in regions containing local minima. In particular, Graphs 32 and 34 demonstrate the effects of momentum upon a gradient descent training algorithm such as those that may be used with the method of this invention. Graph 32 shows a gradient descent technique without momentum. Following a step in prediction from point A to point B along the error surface, the training technique shown finds itself at a point on the error surface where the gradient goes to zero (point B). At a point on the error surface such as point B, the error can either decrease to either side, as in graph 32, or can possibly increase to either side, as in the case of a local minima (such as point C). A typical gradient descent technique without momentum might choose to go in a direction opposite from where the error surface continues to decrease. In such a case, as shown in graph 32 where the training algorithm jumps from point B to point C, the training algorithm may be trapped within a local minima.

Graph 34 of FIG. 6 shows a gradient descent technique incorporating momentum, which tends to be less susceptible to local minima. To avoid learning instabilities such as local minima (areas on the error surface where the gradient goes to zero), momentum can be added to help carry the weights outside the local minimum. A training algorithm incorporating momentum remembers the direction of the step taken in a previous iteration and, if the error decreased as a result of the previous iteration, continues in the same direction. This may help to get the training algorithm over a local minimum (or a local maximum, such as that shown in graphs 32 and 34). As shown in graph 34, after taking a step from point A to point B, the training algorithm continues in the same direction to point C. The training algorithm with momentum reaches a lesser error point along the error surface and successfully avoids the local minimum.

While not foolproof, incorporating momentum into a gradient descent technique can sometimes lead to extrication from local minima, or other irregularities in the error surface, in a more efficient manner. Without momentum, the same training algorithm may take more steps to reach the same error goal or may not be capable of reaching the error goal at all.

The adaptive learning rate of the ANN training method of this invention (whether incorporating momentum or not) starts off at a user-set value. If, after taking a step proportional to the current learning rate in the direction of the gradient the error increases, the method of the present invention takes a smaller step in the next iteration. The learning rate is adjusted down, but if the error decreases in a future iteration, the adaptive learning rate can be adjusted up. Typically, the value of the adaptive learning rate is a small positive value (e.g., 0.002 or 5.0).

The value of the adaptive learning rate of the ANN training method of the present invention is based upon the improvement that will be occurring in the next iteration of the training algorithm. In other words, instead of setting the adaptive learning rate value based on the total error remaining until the specified training error goal is reached, the ANN training method of the present invention focuses on the amount of improvement to be made in the next iteration (i.e., the reduction in error from the previous iteration).

Another embodiment of the ANN training method of the present invention is a hybrid optimization/training algorithm incorporating aspects of both gradient descent and stochastic training techniques. In any gradient descent technique (such as back-propagation), a location within the weight space can be reached in which the error surface increases locally in every direction (such as a valley in the error surface). In such a case, one solution is to re-train the artificial neural network from a different randomly-initialized starting point. Depending on the complexity of the network and the desired mapping, it may or may not be likely that the same or a different local minimum may again be reached.

Stochastic techniques (such as simulated annealing) will bounce right out of such a local minima, but are much slower than gradient descent techniques. Although susceptible to local minima, back-propagation is very fast, and once the training algorithm is in the correct neighborhood of the error surface, back-propagation is much better at fine-tuning parameters until the deepest cranny of a minimum is reached. For this reason, a hybrid optimization/training algorithm incorporating aspects of both back-propagation and simulated annealing is desirable.

Training speed is important overall, so the back-propagation process is not interfered with until a local minimum is reached. This condition is manifested whenever the adaptive learning rate plummets. When ANN 10 reaches a minimum and tries to continue training, each step the training algorithm takes increases the prediction error. As specified by the adaptive learning rate adjustment algorithm, the learning rate is slightly diminished by each step (iteration) and approaches absurdly small values (e.g., $10^{-12}$) very quickly. This is an indication that backpropagation has directed ANN 10 into a minimum in the error surface.

Once backpropagation has directed ANN 10 into a minimum in the error surface, the learning rate is re-initialized and an element of randomness is introduced: several prospective small magnitude random weight changes are added to the weights. These weight changes are sampled from a zero-mean, small-variance, multi-variate, distribution (e.g., a gaussian distribution). Several prospective networks are produced, each slightly different from the original "stuck" network and the other prospective networks. The number of prospective networks generated can vary, but a good number is between five to ten candidates.

These prospective neural networks are trained for a short period of time (a preset number of iterations), and the prospective network that results in the largest decrease in prediction error is used to replace the original artificial neural network and continue training. If this new network falls back into the same minimum, then more prospects are generated from a wider distribution. Eventually, if each new artificial neural network keeps falling into the same minimum, the weights are re-initialized and training proceeds anew.

Figure 7A:
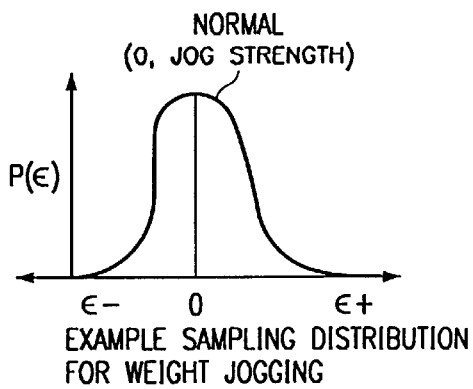
FIG. 7A shows the distribution from which weight changes can be selected when "jogging" the weights in an embodiment of this invention.

FIG. 7A shows the distribution from which weight changes can be selected when "jogging" the weights. "Jogging" the weights refers to the process of randomly adjusting the value of the weights around the current value in the hope of moving the ANN from a local minimum, or other irregularity in the error surface, to a point where it will avoid the local minimum as it continues training. When a local minimum is first reached, a random value for the weight changes is selected according to a distribution parameterized by a small epsilon (width), as shown in FIG. 7A. The next time the same minimum is reached, the random value is selected from a distribution with a larger epsilon.

Figure 7B:
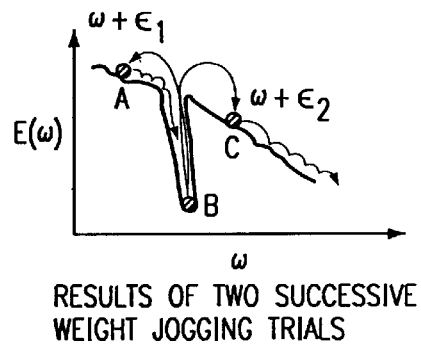
FIG. 7B shows a possible result of two successive weight jogging trials.

FIG. 7B shows the results of two successive weight jogging trials, illustrating that by changing the weights, the ANN position on the error surface can be changed. FIG. 7B depicts an ANN reaching a local minimum at point B on the error surface. To either side of point B, the prediction error increases sharply and hence the adaptive learning rate adjustment algorithm will diminish the learning rate in subsequent iterations until it approaches an absurdly small value. The weight jogging technique of this embodiment of the present invention can be used to escape from the local minimum at point B by introducing an element of randomness to the weights, as sampled from the distribution shown in FIG. 7A.

FIG. 7B shows two prospective networks that were produced using different width distributions. The first prospective network, after being selected to replace the original ANN, moves from point B to point A and then back to point B, thus reaching the same local minimum as the original ANN. The second prospective network, however, trained after jogging the weights with a value chosen from a larger width distribution, moves from point B to point C along the error surface, escaping the local minimum and resulting in a decrease in the prediction error.

A further embodiment of the improved training algorithm of the method of the present invention provides a more efficient method of choosing a representative training dataset. This embodiment chooses a representative dataset using a combination of clustering and adaptive representative data selection during training. Selection of data for training an ANN model determines an upper limit upon the utility of that model. A training dataset that is too small may not adequately describe the mapping to be performed. A training dataset that is too large may slow down the training process and can over-represent certain areas of the data. Over-representation of one area of data results in a proportional under-representation of another area. An ANN will then learn to predict much better for one region of the domain of the mapping, at the expense of prediction in other regions.

Data selection usually requires the time and attention of a domain expert (i.e., one who has knowledge of the system that generated the data). Automated procedures involving data clustering are sometimes utilized (as they are here). Clustering involves determining which data records are similar to, or at least distant from, one another. The similar ones are grouped together, generating "clusters." The clusters may be used to generate centroids (averages) or to determine the closest actual data points to the centroids. Either way, each of these points are representative of the other points in the cluster and may be used to generate an initial training dataset.

Clustering is used to generate a small training dataset amounting to the lesser of 10% of the entire dataset available or 20 data points. This small dataset represents a starting point. An additional technique is used when necessary to adaptively increase the size of the training dataset by one data point increments during training. This adaptive process is performed every time training achieves an intermediate error goal on the training data, but does not achieve this goal with respect to the remainder of the data from which the training data was selected. Once the intermediate training goal is achieved with respect to the entire data set, a lower goal is set. The process repeats until the lower goal corresponds to the termination criterion.

The training algorithm selects new data points, by one of two criteria. The first criterion is the greatest prediction error, a very prosaic equivalence between ANN performance and training data selection—if prediction is poor for a data point, then the characteristics exhibited by the data point must be under-represented in the training dataset.

The second criterion is more abstract. When an otherwise trained ANN has difficulty with the mapping associated with a particular point, there are two possible explanations. Either there are no nearby (i.e., exhibiting similar inputs) data points with similar outputs included in the training dataset, or there are nearby data points that have quite different outputs. These "excuses" may be formulated into two equations for prediction difficulty:

$$diff_1(\alpha) = \frac{\min}{\beta_1}\{\|D(\alpha_1) - D(\beta_1)\| + \|\alpha_1 - \beta_1\|\}. \quad \text{Equation (8)}$$

$$diff_2(\alpha) = \frac{\max}{\beta_2}\{1 + \|D(\alpha_2) - D(\beta_2)\| - \|\alpha_2 - \beta_2\|\}. \quad \text{Equation (9)}$$

$\beta_1$ and $\beta_2$ in the above equations represent the particular input vectors from points from the training set that minimize/maximize their respective equations. $\alpha$ represents the input vector from a data point not yet included in the training set. $D(x)$ represents the desired output vector associated with the input vector $x$.

The points that are not yet included in the training dataset are cycled through until one is identified that possesses the greatest sum of the two difficulties. This data point is the next point included in the training dataset.

The combination of clustering and adaptive representative data selection during training results in fast-learning, balanced, and more accurate ANNS. Training data requirements are generally a fraction of a percent of that necessary with other methods and do not require the extensive time and attention of a domain expert.

The training algorithm of the present invention solves a fundamental limitation in training artificial neural networks—the necessity of having a great deal of knowledgeable human interaction to adequately train the artificial neural network. The training algorithm of this invention is automated to the point that if the data in the dataset is correctly formatted and provided to the algorithm, the algorithm can itself generate an optimal neural network.

As it trains, the training algorithm of this invention selects a representative training dataset from a dataset that is too large to be efficiently used in its entirety and which is, hopefully, representative of the system being modeled. For example, the training algorithm can be provided with a model of an entire field cycle of data. The training algorithm could start off with one data pattern (a vector of values of, for example, temperatures, pressures and flows in a nuclear reactor) and a very small network. As it trains, it can add more patterns. The algorithm selects the patterns from the entire dataset, but each new pattern selected must describe the remaining dynamics and variations in the remaining data.

Typically, the training algorithm of the method of this invention selects 1/1000th or less of the characteristic data for the training dataset. The automated data selection of this embodiment of this invention can also work in conjunction with the adaptive learning rate of the first-discussed embodiment of this invention. In such a case, the automated data selection of this embodiment can select a representative training dataset and determine, from one iteration to the next, whether the prediction error is decreasing or increasing and adjust the adaptive learning rate to minimize the prediction error. The automated data selection of this embodiment of the present invention can be in software.

Equations (8) and (9) above demonstrate the basic criteria used in the automatic data selection of this embodiment of this invention. If a data point in the pool of data points is very near a training data vector (i.e., a point already in the training dataset), it is treated as an individual vector in n-dimensional space. If the training point also has an output associated with it that is similar to the output of a data point that is already in the training dataset, it should be easy to learn the new data point. If the training data point that is to be added is very far away from any points previously included in the representative training dataset, then it will be more difficult to learn the new data point and the point is less represented in the representative dataset.

The automatic data selection of this embodiment of the present invention combined with the adaptive learning rate of another embodiment of this invention can result in a training algorithm that is faster than any previous ANN training algorithms. The increase in training speed and efficiency provided by this invention can, for example, provide a user with a choice between spending less time generating a trained network or spending an equivalent amount of time training a network as might be required with current methods, but ending up with a better network having improved accuracy of prediction. The method of this invention can result in up to a 99.5% accuracy rate, which corresponds to what may be a theoretical maximum in prediction error. The remaining 0.5% may be contained in the input segment network. In other words, the remaining 0.5% prediction accuracy can be attributable to unpredictable factors such as human intervention, intervention of natural factors, etc.

Additionally, the automatic data selection method of this embodiment of this invention provides the capability of modeling a system with a much greater number of variables than previous ANN training algorithms. The method of this invention provides for much greater robustness and for a greater number of variables and data patterns.

Figure 8:
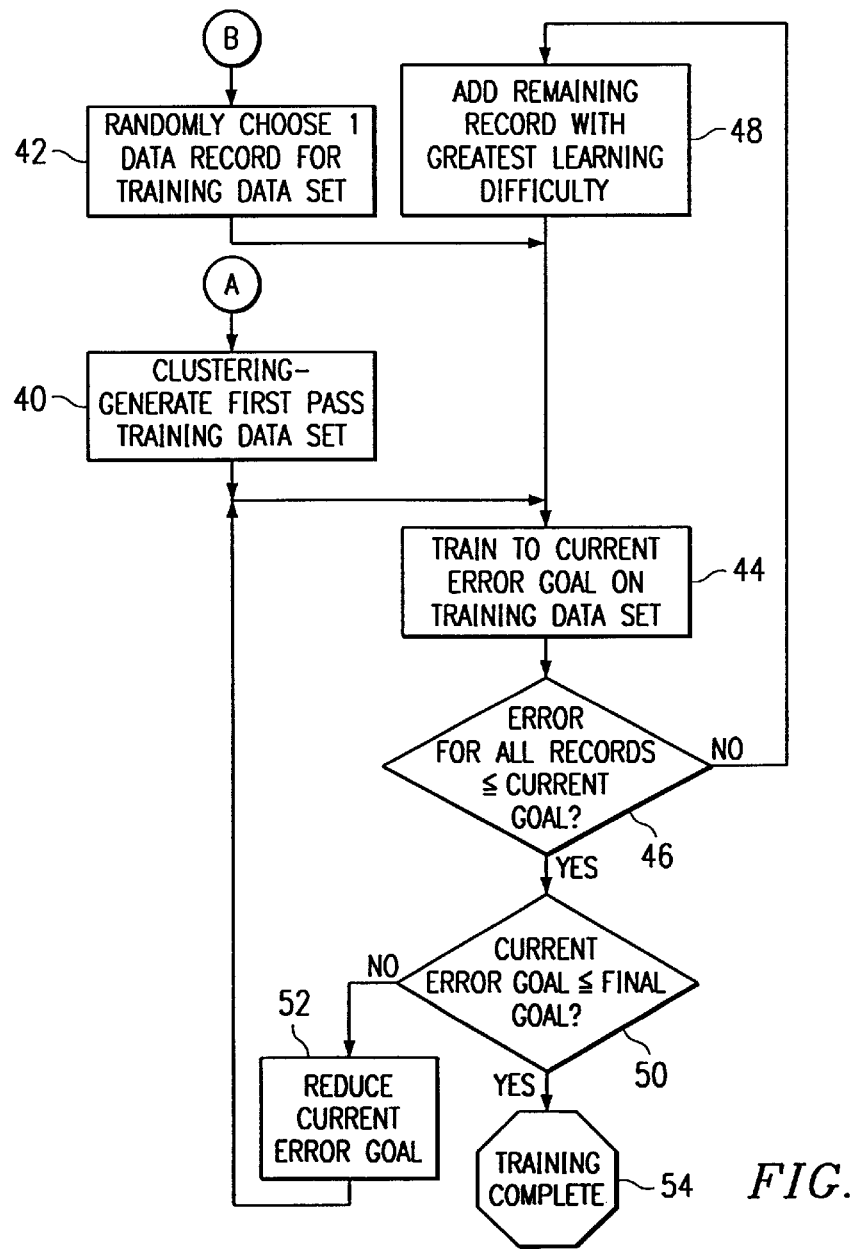
FIG. 8 illustrates how data points are selected to obtain a representative training dataset in an embodiment of this invention.

FIG. 8 illustrates how data points are selected for the representative training data set using the automatic selection method of this embodiment of this invention. Automatic selection can be accomplished in either of two ways. The method either starts off with only one point from the data set (Path B, starting at step 42), or it starts off with a set of points which are selected using a clustering method (Path B, starting at Step 40).

At step 40 of FIG. 8, along path A, the method of this invention uses the clustering technique to generate a first-pass training dataset. This first-pass training dataset is used to train the artificial neural network to a preset error goal at step 44. At step 46, the ANN training method of this invention determines whether the intermediate error goal has been achieved for all the records in the group of data records and not just with respect to the training dataset. If the intermediate error goal has not been achieved for all of the data records, at step 48 a new data record (point) is added according to the difficulty criterion of equations (8) and (9) discussed above for selecting a new data point to add to the training dataset. At step 48, the record from the group of data records is chosen that has the greatest learning difficulty, i.e., the record (data point) that exhibits the greatest prediction error. The idea behind this criteria is that if prediction is poor for a data point, then the characteristic exhibited by that point must be under-represented in the training dataset.

The ANN training method of this invention proceeds once again to step 44 to train to the current error goal with the now expanded training dataset. The same procedure described above for Path A also applies if the training algorithm starts instead along Path B at Step 42. Path B illustrates the case of training ANN 10 starting with a single data point. Otherwise, the description above and that follows is the same for either Path A or Path B.

If at step 46 the intermediate error goal has been achieved for all records, the method of this embodiment of this invention proceeds to step 50. At step 50, the method of this embodiment determines whether the current error goal is less than or equal to the desired final error goal. The initial intermediate error goal can be set, for example, to 30%. The final error goal might be, for example, 1% or less.

If at step 50 the current error goal is less than or equal to the final error goal, the method of this embodiment of this invention proceeds to step 54, where training is complete. If not, then at step 52 the current intermediate error goal is reduced by a specified amount and the method of this invention returns to step 44 to train to the new current error goal. The method repeats until the current error goal corresponds with the termination criterion final error goal.

Figure 9A:
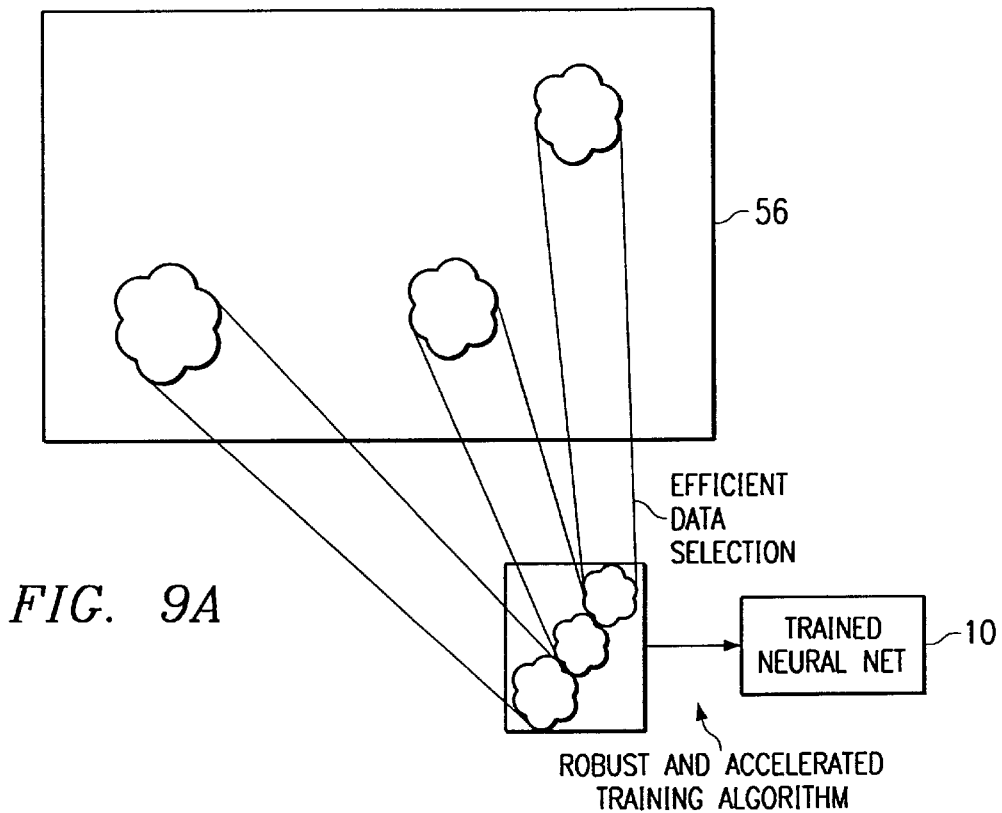
FIGS. 9A and 9B are a conceptual representation contrasting the efficient data selection method of an embodiment of this invention with the prior art.
Figure 9B:
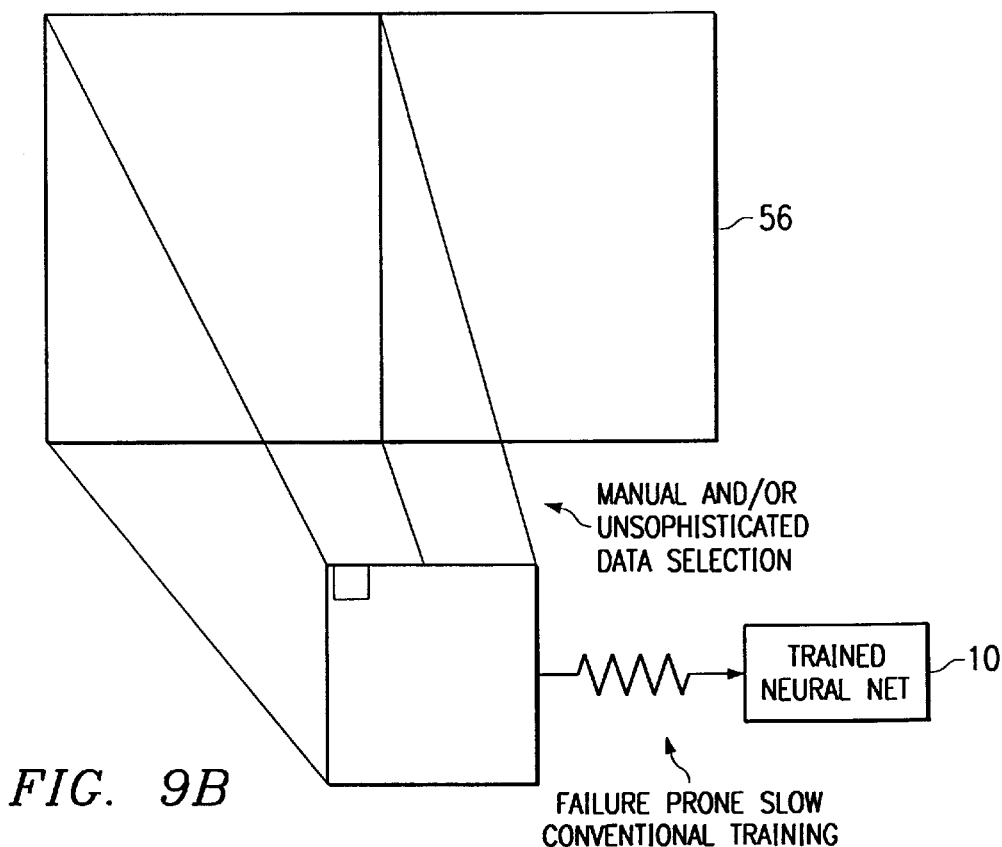

FIGS. 9A and 9B are a conceptual representation contrasting the efficient data selection method of this embodiment of this invention with the prior art. FIGS. 9A and 9B demonstrate how the method of this embodiment of the present invention handles bigger and more complex (i.e., harder relationships) datasets. As shown in FIG. 9A, the method of this invention can select only the representative data records from data record set 56 necessary to capture the required relationships to train ANN 10. The optimal data selection method of this embodiment of the present invention allows us to select the best training data set for use by the ANN training methods of other embodiments of the present invention to model the system in question.

FIG. 9B, in contrast, shows the haphazard or unsophisticated data selection methods of prior training algorithms. The data records selected from data record set 56 are used to achieve a trained ANN 10 through a failure-prone and slow conventional training algorithm. Already handicapped by poor data selection, current training algorithms are not as capable at recognizing and capturing the complex non-linear, multi-variate relationships that can be expressed in the training data. As shown in FIGS. 9A and 9B, the training data requirements for this embodiment of this invention are only a fraction of a percent of those necessary with other methods and result in a more efficiently trained and better predicting ANN 10.

A still further embodiment of the present invention is a technique for automated optimization of neural network size by adaptively adding nodes and layers during the training process. A painstaking task associated with artificial neural network development is optimization of the artificial neural network architectural considerations, i.e., the number of hidden layers and number of nodes in each layer. This is a very serious task, as too large a network can easily over-learn (memorize) the training data instead of inferring the general relationships, while too small a network is only capable of learning the most broad relationships.

Automated optimization is performed by adaptively adding nodes and layers as needed during the training process. This is accomplished by determining when learning progress has ended and weight-jogging and re-initialization of the ANN are no longer effective in reducing error. These events indicate that the ANN is not complex enough and that it is time to introduce more free parameters. Learning progress is determined to have ended when a predetermined error goal cannot be achieved by the ANN training algorithm. New nodes, and possibly new layers, can be added to decrease the prediction error and progress toward achieving the set error goal. The automated optimization method of this embodiment of this invention can in this way derive an optimal ANN size to model the system in question.

While it is desirable to produce more features that are available to the rest of the ANN, it is also important to keep adding higher-level nodes. Toward this end, nodes are added first to the smallest layer of the network. In the case of a draw, the earlier layer (closest to the input layer) gets the new node. After a preset number of nodes have been introduced, a hidden layer of one node can be added just prior to the output layer.

FIGS. 10A, 10B and 10C illustrate the node- and layer-adding capability of this embodiment of this invention and show how the ANN can grow in complexity. FIG. 10A shows the first case discussed above, where there is a distinct smallest hidden layer in ANN 10. In this case, a new node 58 is added to the hidden layer closest to output layer 62 because it is the smallest hidden layer in ANN 10. FIG. 10B illustrates the method of this embodiment of the present invention in the case of a tie for the smallest layer in ANN 10. New node 58 is added to the smallest layer closest to input layer 60 because it is the earliest of the two equally-sized smallest layers in ANN 10. Together, FIGS 10A and 10B show that ANN 10 is always bottom heavy.

FIG. 10C illustrates the capability of this embodiment of the method of this invention to add a new hidden layer 66 comprised of new node 64 just prior to output layer 62. FIG. 10C also shows new nodes 58 previously added to hidden layer 1 and hidden layer 2 in prior iterations of the training algorithm.

To avoid losing ground when adding a node or layer, as in FIGS. 10A, 10B and 10C, ANN 10's weights are re-indexed appropriately, so that all nodes receive the same inputs and play the same roles in the mapping. Likewise, to ensure that a new node or layer discovers a useful role to fill within ANN 10, several candidates are created. ANN 10, including each new node or layer, starts training from the pre-node addition state. ANN 10 is trained for several cycles to evaluate which of the candidate node(s)/layer(s) is the best addition. The best candidate is selected and training continues.

The method of this embodiment of this invention for automatically adaptively adding nodes and layers provides the capability of having a multi-layer architecture wherein each layer has multiple nodes. The method of this embodiment also eliminates the dependence on intensive expert attention to the training and data selection for the neural network. In combination with the previous embodiment of this invention, the training algorithm of this invention can select data as it trains, adding more and more data points until it begins to notice that the relationships in the data are getting too complicated for the model. Once this occurs, the training algorithm can start to add nodes and layers to ANN 10 to make it more complex and able to model larger and more complex systems. ANN 10 can start small, with selection of a single data point or an initial training dataset from some cluster of data, and as it begins to add data points to the representative training dataset it may reach a point where it no longer has enough free parameters to adequately describe the non-linear, multi-variate relationships between the data. If this happens, ANN 10 may not be able to meet the predetermined error goal as it tries to learn these additional patterns. The method can respond by adding nodes to layers and by adding additional layers as necessary.

The ability of the automatic optimization method of this embodiment of the present invention to achieve an optimal ANN 10 size and increase training efficiency can be tested in a functional way by simply comparing the outputs of ANN 10 with the outputs for a given input as measured in the actual system which ANN 10 is modeling. This functional test of ANN 10, while superficial, is sufficient with the method of this embodiment of this invention and does not require near the amount of laborious checking and verifying that needs to be performed with any other neural network training techniques.

Also, since the method of this embodiment of this invention seeks to achieve an optimal ANN 10 size, it results in faster training and greater accuracy than previous methods. The recall time of ANN 10 is kept to a minimum without sacrificing accuracy, providing better answers with a smaller size than would be necessary with any other technique. It is therefore possible to predict more estimates per unit time with an ANN 10 trained using this training algorithm. The automatic optimization method of this embodiment also lends itself to real-time applications.

In certain applications it may be desirable to update the ANN 10 model because the system that is being modeled has somehow changed. For example, on a nuclear power plant, power may have to be taken down to 70% from 90% to change out some part of one of the steam generators or some other part of the system. The relationships between the variables of the system will change slightly because of the change in mode of operation. By combining the embodiment of this invention which automatically selects data and with the embodiment for automatically deriving the optimal ANN 10 size, ANN 10 can be trained in real time. While predicting the model for a given set of parameters, another network can, at the same time, be trained and re-deployed to replace the prior neural network, in the event of changed conditions, without requiring human intervention.

FIG. 11 illustrates one possible deployment of the ANN training method of this invention in a real-time system. FIG. 11 shows a simplified block diagram demonstrating the real-time prediction and on-line training capability of this embodiment of the present invention. Block 68 shows the current measurements (data or other inputs) being taken as inputs from actual physical instruments such as a telephone, a thermometer, or barometer, as shown in block 67. The current measurements are forwarded from block 68 to block 70 and block 74. Block 70 is the currently deployed ANN 10 model. Block 74 represents a model performance and system state evaluation stage, which is used to account for any changes in the configuration of the system being modeled. In block 74, both the current inputs and the predictions, estimates, or classifications from the artificial neural network represented by block 72 are taken in as inputs and can be used to generate and deploy a new artificial neural network in real-time and to account for any system changes. At block 76, the current inputs/outputs that are fed into block 74 to use as a real-time evaluation model are trained in real-time or near real time. In the event that system changes occur that necessitate replacing the current deployed artificial neural network model 70, the new artificial neural network being designed and trained in real time at step 76 can be deployed from block 76 to replace artificial neural network model 70. The new ANN can then continue to model the system. Real-time updating provides the capability to deploy an updated ANN continually, thus updating the model to provide better representation.

The technique for obtaining the optimal network size of this embodiment of the present invention essentially creates candidate nodes (typically a user-specified amount between three and five), and takes the first candidate node that was randomly initialized and trains the ANN for a specified amount of time with that node to see how quickly the ANN improves. The network is then reset to its previous stage, the next candidate node is randomly initialized, the network is again trained for a specified amount of time. The ANN is reset to its previous stage and the process is repeated with the next candidate node, and so on, until the best candidate is determined. This process can be analogized to not hiring the first person off the street and training them to become patent examiners useful in a particular role, but instead interviewing and hiring the most qualified person.

A still further embodiment of the present invention provides for a multiply-connected ANN. In a multiply-connected ANN, each node is connected to every other node in all of the layers. As a consequence of the increased number of connections, much more complex mappings are made possible with the same size ANN. With the much higher-level nodes having access to both lower- and higher-level features (including the inputs), it is easier, for example, to imagine the ANN developing several sub-networks in the first layers devoted to identifying which subsequent sub-networks are appropriate to the current location of the mapping domain. This more complex ANN structure allows sophisticated hierarchies and hybrid artificial neural network systems to be automatically created as necessary, without requiring an artificial neural network researcher to individually train and tune several ANNs. The advantage of using a multiply-connected ANN is that size can be kept to a minimum and still retain the capacity to capture complicated relationships.

Figure 12:
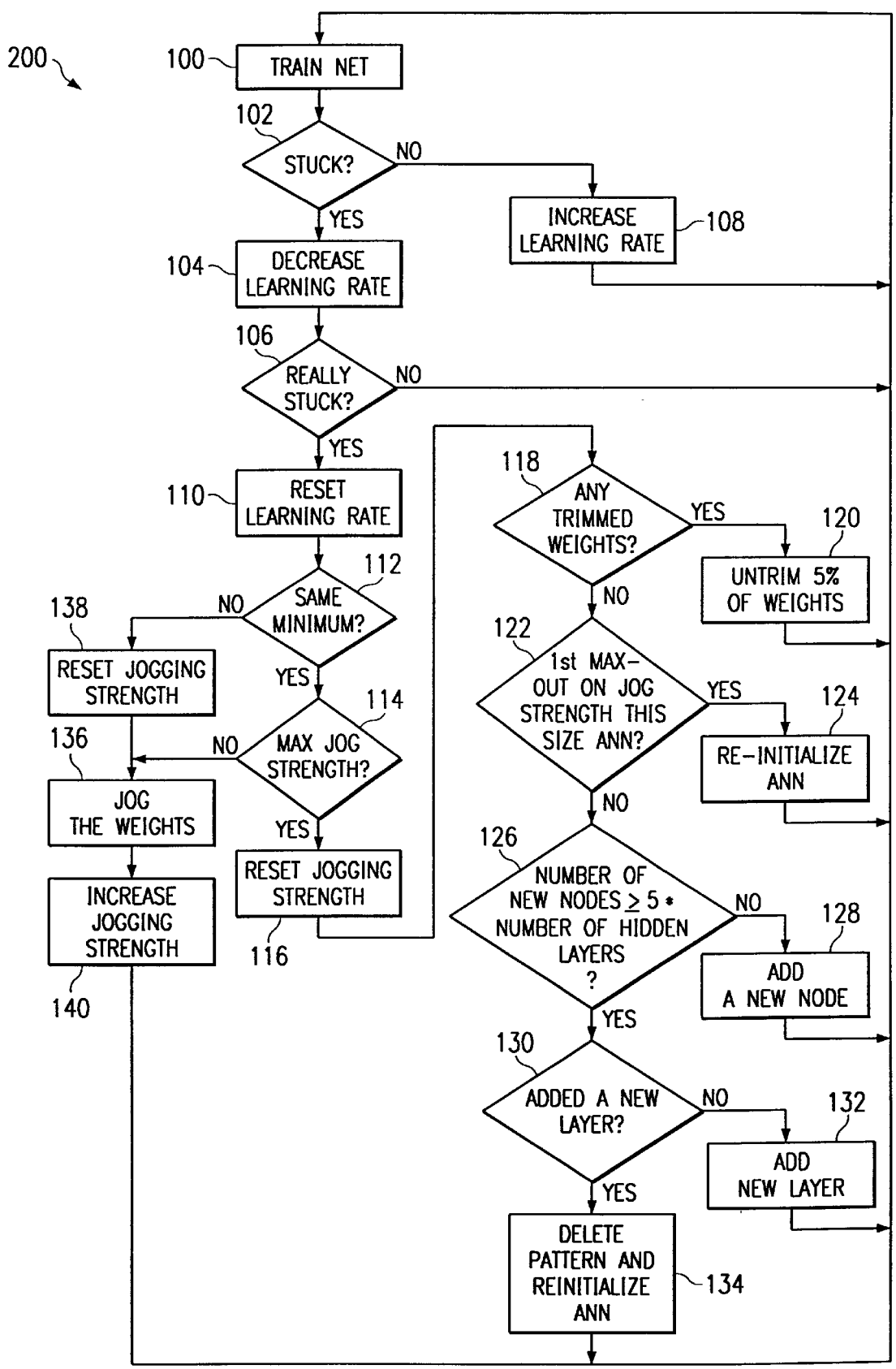
FIG. 12 illustrates one way in which the various embodiments of this invention can be implemented.

The improvements to previously existing artificial neural network training methods and systems mentioned in the various embodiments of this invention can occur in conjunction with one another (sometimes even to address the same problem). FIG. 12 demonstrates one way in which the various embodiments of this invention can be implemented and scheduled. FIG. 12 does not demonstrate how representative dataset selection is accomplished, but instead starts at train net block 100 with representative training dataset already selected.

The training dataset at block 100 can consist initially of one kind of pattern that is randomly selected, depending on whether or not clustering is used. Where clustering takes place, it takes place prior to any other data selection. Assuming, as an example, that clustering has been employed to select twenty training patterns, ANN 10 can then be randomly initialized, all the parameters can be randomly initialized around zero, and ANN 10 can take those 20 data patterns and for each one calculate the gradient and multiply the gradient by the initial value of the learning rate. The adaptive learning rate is user-definable, but is usually initially set around unity (1). For each of the representative data patterns initially selected, the training algorithm of this invention calculates the incremental weight step, and after it has been presented all twenty of the data patterns, it will take the sum of all those weight steps. All of the above occurs at train net block 100.

From train net block 100, the training algorithm of this invention goes to step 102 and determines whether the training algorithm is stuck. Being stuck means that the training algorithm took too large a step and the prediction error increased. Once the training algorithm determines that it is stuck at block 104 it decreases the adaptive learning rate by multiplying it by a user-specified value. A typical value is 0.8, which decreases the learning rate by 20%.

If the training algorithm reaches block 102 and determines there has been a decrease in the prediction error (i.e., it is not stuck), the training algorithm proceeds to block 108 and increases the learning rate. The training algorithm returns to block 100 from block 108 to continue training the ANN with a now increased adaptive learning rate.

The training algorithm proceeds to block 106 after decreasing the adaptive learning rate in block 104 and determines whether it has become "really stuck." "Really stuck" means that the adaptive learning rate decreased to some absurdly small value on the order of $10^{-6}$. Such a reduction in the adaptive learning rate can come about as a result of the training algorithm landing in a local minimum in the error surface. The adaptive learning rate will normally attempt to wiggle through whatever fine details are on the error surface to come to a smaller error point However, in the natural concavity or flat spot of a local minimum there is no such finer detail that the training algorithm can wiggle down to. In such a case the adaptive learning rate decreases to an absurdly low number.

If at block 106, if the training algorithm determines that it is really stuck (i.e., that the learning rate has iteratively decreased to an absurdly small value), it proceeds to block 110 and resets the adaptive learning rate to its default initial value. In the event that the training algorithm is not really stuck at block 106, it returns to block 100, recalculates the weight steps, and continues training with newly-modified weights. The training algorithm continues through the flow diagram, as discussed above and below.

Once the adaptive learning rate is reset at block 110, the training algorithm proceeds to block 112, where it determines whether the minimum in which it is currently stuck is the same minimum in which it has been stuck in the past (if it has been stuck before). This is because as the training algorithm is learning it will sometimes get out of a local minimum and wind up in the same minima at a future time. If it finds itself stuck in the same minimum, the training algorithm checks, at block 114, whether it has achieved a maximum on the gaussian distribution from which a random value is chosen to perturb the weights (i.e., whether the maximum jog strength has been achieved). The "maximum jog strength" is the maximum value from the gaussian distribution. If the maximum jog strength has been achieved, at block 116 the training algorithm resets the jogging strength.

The jogging strength is reset at block 116 because the problem is not so much that the training algorithm has found itself in a local minimum, but that the ANN is not complicated enough. The training algorithm moves to block 118 and determines whether it has, prior to this point, trimmed any weights. "Trimming weights" means to set those weights to zero and take them out of the training algorithm. The procedure for trimming of weights will be described more fully with respect to FIG. 13 below.

If at step 118 the training algorithm determines that weights have previously been trimmed (i.e., that the weights have been previously randomly affected but the training algorithm still wound up in the same minimum because the network was not complex enough to get any more accuracy out of the mapping), the training algorithm moves to step 120 and untrims 5% of the weights. This means that weights that were previously trimmed are allowed to resume at their previous value, and from this point on they will take part in the training algorithm. The training algorithm returns to step 100 and continues to train as before.

By untrimming 5% of the weights, the training algorithm returns a little more complexity back to the model in hopes of decreasing the prediction error. If prediction error does not decrease, the training algorithm will once again reach a local minimum and the training algorithm will determine once again at block 112 whether it is stuck in the same minimum as before. Note, however, that at block 110 the adaptive learning rate is reset before addressing the complexity issue of untrimming previously trimmed weights, so it takes some iterations through blocks 100, 102, 104, 106 and 110 before getting back to the process of untrimming any more weights. In the event the training algorithm does wind up in the same minimum, the maximum jog strength will not have been reached, since it was previously reset at block 116 in a prior iteration. Instead, the training algorithm will proceed to block 136. At block 136 the weights are jogged, and at block 140 the jogging strength is slightly increased according to a gaussian distribution. Following block 140, the training algorithm proceeds to train net block 100 and continues training.

If in the course of training the training algorithm again reaches the same minimum, the procedure above is repeated. In the event the jog strength once again reaches the maximum level at block 114, the training algorithm resets the jogging strength as previously discussed. If the training algorithm reaches block 118 after several rounds of untrimming weights that there are no longer any trimmed weights, the training algorithm proceeds along the "no" path to block 122.

At block 122, the training algorithm determines if this is the first time it has maxed out the jog strength on this size ANN. The training algorithm keeps a counter of how many times the jog strength has maxed out with an ANN of a given size. If this is the fist time the jog strength has maxed out for the current ANN size, the training algorithm proceeds along the "yes" path to block 124 and completely re-initializes the ANN. All of the weights are re-initialized and the ANN is restarted from scratch. The training algorithm proceeds to block 100 and commences training the net anew. The ANN, however, remains whatever size it was in terms of number of hidden layers and number of nodes when training resumes at train net block 100 with the newly re-initialized weights.

At block 122, if the answer is "no," the training algorithm proceeds along the "no" path to block 126. At block 126 the training algorithm has already maxed out the jog strength more than once for the current size ANN. Block 126 tests to see how many new nodes have been added for the current state of the representative training dataset. The training algorithm determines if the number of new nodes added for this size ANN is greater than or equal to five times the number of hidden layers in the ANN. If the number of new nodes added is not equal to or in excess of 5 times the number of hidden layers in the ANN, the training algorithm proceeds along the "no" path to block 128. At block 128, a new node is added according to the procedures discussed above and the training algorithm proceeds to train net block 100 to continue training the artificial neural network with the addition of the new node. The training algorithm of this invention will then proceed as discussed above.

If the number of new nodes added exceeds five times the number of hidden layers, the training algorithm proceeds along the "yes" path from block 126 to block 130. At block 130, the training algorithm determines whether a new layer has previously been added to the ANN. If the training algorithm has not previously added a new layer (since the last time it added a training data pattern), it proceeds along the "no" path to block 132 and adds a new layer to the artificial neural network. The training algorithm then proceeds to block 100 and continues to train the net with the newly added layer. If a new layer has been added since the last training pattern was added, the training algorithm proceeds along the "yes" path to block 134.

If a new layer has previously been added, it means that the training algorithm has previously added a number of nodes, has jogged the weights a number of times, and has added a layer because of the new training data pattern that has been added in the previous iteration. The training algorithm decides by going to block 134 that the training data pattern added recently is an out-lier and does not fit in with the other patterns that the neural network recognizes. In such a case, at block 134 the training algorithm removes that training data pattern from the representative training dataset and also removes it from the larger pool of data records from which the training algorithm is automatically selecting the training dataset. The training algorithm once again proceeds to train net block 100 and continues to train the network without the deleted data pattern.

Returning to block 112, if the training algorithm decides that it has not fallen into the same minimum, it proceeds along the "no" path to block 138. At block 138, the training algorithm resets the jogging strength to give only a small random perturbation to the weights and parameters in an attempt to extricate itself from a new local minimum. If the training algorithm reaches a new local minima, we want the training algorithm to start over again. It is desirable to reset the jogging strength because to give a small random perturbation to the weights and parameters. The intent is to start off with a small perturbation and see if it is sufficient to extricate the training algorithm from the new local minimum.

After resetting the jogging strength in block 138, the training algorithm proceeds to block 136 and jogs the weights. The training algorithm proceeds to block 140, increases the jogging strength, and proceeds to block 100 and trains the net with the newly increased jogging strength.

FIG. 12 thus gives us an overview in operation of the various embodiments of the training algorithm of the method of the present invention.

Figure 13:
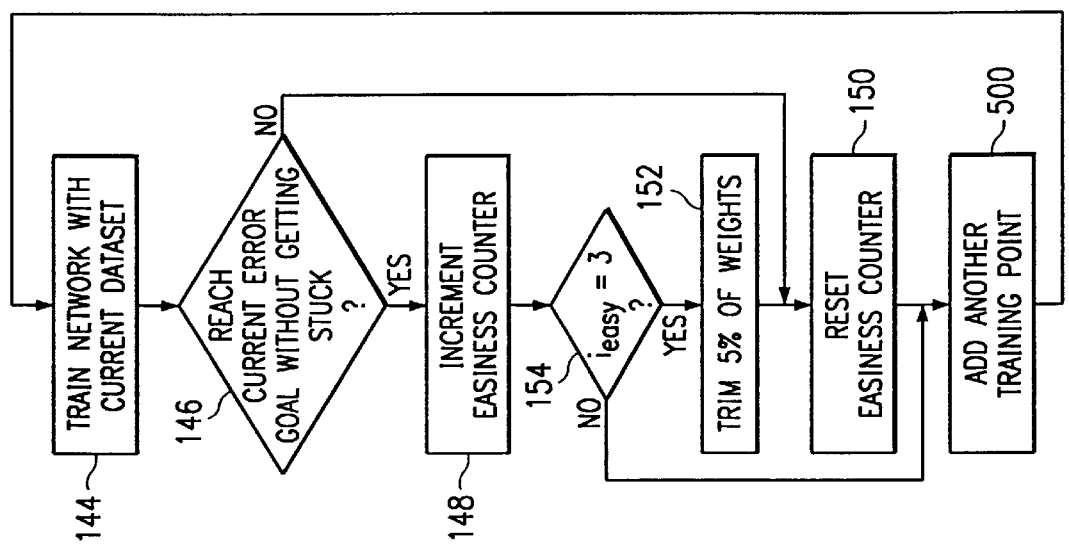
FIG. 13 is a block diagram representation of the implementation of the weight trimming procedure of an embodiment of this invention.

FIG. 13 is a block diagram representation of the implementation of weight trimming, as discussed in conjunction with FIG. 12. Trimming weights takes place to reduce the complexity of the network. It is a non-linear regularization technique (i.e., to avoid over-fitting). The process depicted in FIG. 13 can take place whenever the intermediate error goal discussed as part of the representative data selection embodiment of this invention is met after adding a data point (i.e., block 46 of FIG. 8). The weight trimming discussed in conjunction with FIG. 12 occurs in block 100 of FIG. 12. Block 144 of FIG. 13 corresponds to block 100 of FIG. 12.

At block 144, the artificial neural network is trained with the currently selected dataset following the addition of a data point. While being trained, the ANN may reach a local minimum and the weights may have to be jogged or nodes/layers added as described above in FIG. 12. The preset intermediate error goal may eventually be reached. The training algorithm proceeds to block 145 and determines whether the preset current error goal has been reached by the training algorithm without getting stuck (i.e., without reaching a local minimum). If the current error goal is reached without getting stuck, the training algorithm proceeds to block 148 along the "yes" path and increments the easiness counter. Once the easiness counter reaches a predetermined value (for example, "3") at block 154, the training algorithm determines that the ANN is too complex. Since we do not want to over-fit the data, if we find that the training algorithm can add three data points and reach the intermediate error goal without getting stuck and having to take measures such as jogging the weights or untrimming weights or adding nodes or layers, the training algorithm trims a certain percentage of the weights (for example, 5%) having the least absolute magnitude.

Having incremented the easiness counter in block 148, the training algorithm proceeds to block 154 and decides whether the easiness counter has reached a predetermined number, here three. If it has, the training algorithm trims 5% of the weights at block 152. The result of this is that those weights are taken out of the training algorithm and are not counted as part of the ANN, thereby resulting in a less complicated ANN that avoids over-fitting the data.

From block 152, the training algorithm proceeds to block 150 and resets the easiness counter. The training algorithm proceeds to step 500 where another data point is added, if necessary. The training algorithm returns to step 144 and the process repeats.

If at block 154 the easiness counter maximum value has not yet been achieved, the training algorithm proceeds to step 500, adds another data point if required, and proceeds to step 144. From step 144, the process repeats as described above. Weights, therefore, are trimmed in response to an indication that the ANN is too complex (i.e., when a preset number of data points are added without the training algorithm getting stuck).

If at step 146 the current error goal has not been reached without getting stuck, the training algorithm proceeds to step 150 and resets the easiness counter The training algorithm getting stuck is an indication that the ANN is not too complex for the given training dataset and hence no weights will be trimmed.

Figure 14:
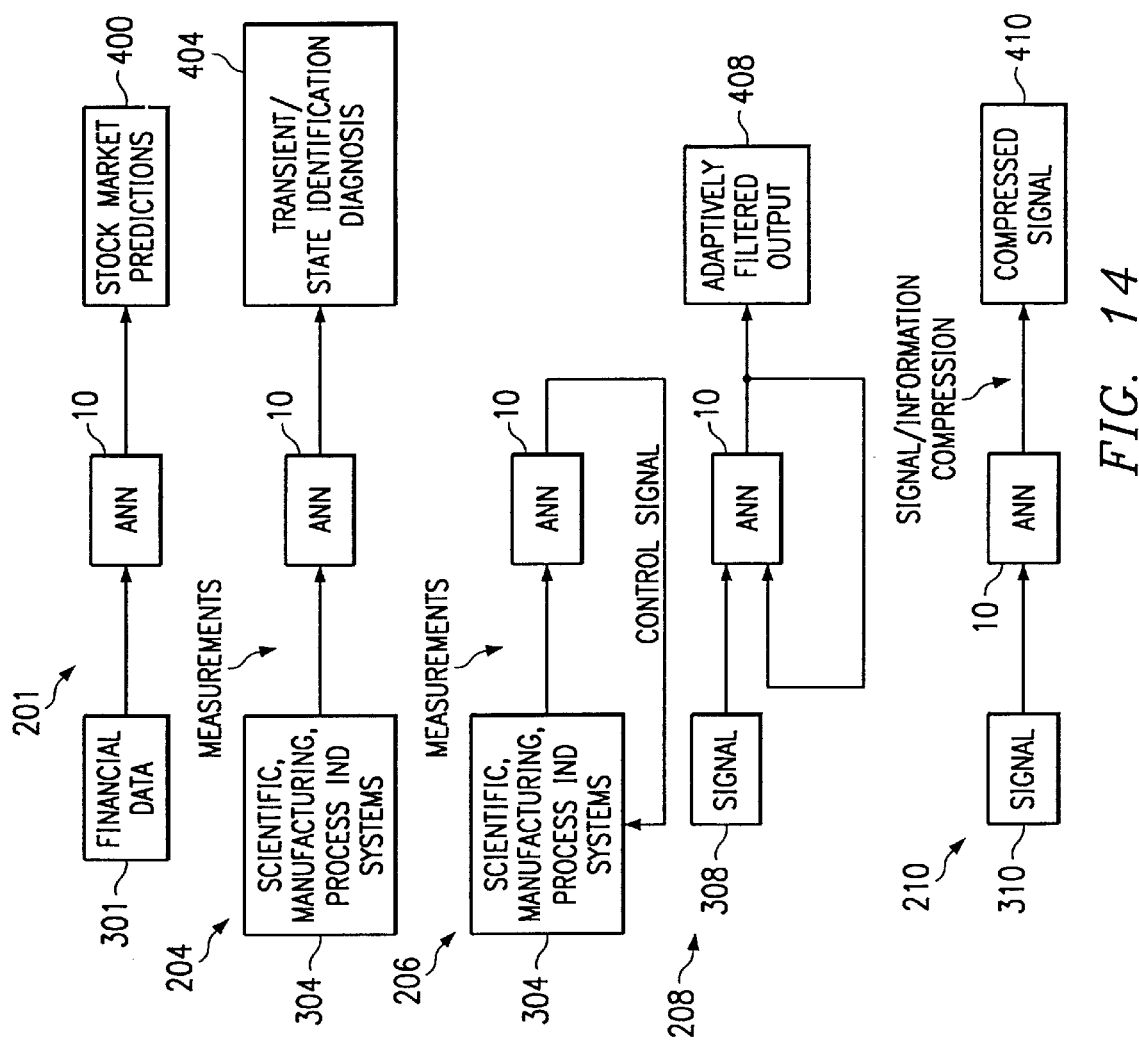
FIG. 14 is a simplified block diagram illustrating some of the roles that an artificial neural network trained with an embodiment of this invention can play in sample applications.

FIG. 14 is a simplified block diagram showing representative applications for an ANN trained with the training algorithm of the present invention. The examples given on FIG. 14 are representative only.

System 201 depicts a use of ANN 10 to predict and model financial data 301 inputs into stock market predictions 400 output (for example, 13-week high and low share value predictions). System 204 uses ANN 10 to take scientific manufacturing and process indication systems input 304 and provide as an output transient state identification diagnosis 404. Similarly, system 206 uses ANN 10 to take the same scientific manufacturing and process indication systems input 304 and send the output from ANN 10 back into the same input-generating parameters as a control signal.

System 208 demonstrates the use of ANN 10 for taking input signal 308 and outputting an adaptively filtered output 408 that is then fed back into ANN 10 as an input to serve in producing a noise-filtered output. System 210 shows ANN 10 taking as an input a signal 310 and providing as an output a compressed signal 410. ANN 10 is serving as a model of a signal/information compression system.

The training algorithm method and system of the present invention provides the capability for working with much larger databases than the prior art. The training algorithm of the present invention is not fazed by large amounts of data as inputs as it can pick and choose a very small amount of data to accurately represent the entire dataset. The present invention can therefore be used to train ANNs to model very large and complex systems and to generate more properly sized ANNs having greater prediction efficiency. Examples of systems which the training algorithm of the present invention can be used to train ANNs to model include large multi-variable systems such as nuclear power plants or any complex process management system having many signals. The present invention can also be used to train ANNs to model mapping applications, demographic applications, targeted advertising, any form of commercial manufacturing and process information, scientific information, and any system that deals with very large and complicated databases.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. In a training system for a neural network, wherein the neural network has an input layer and an output layer, the training system training the neural network by performing a method comprising the steps of:
   initializing the neural network with one or more weights of random value;
   setting an adaptive learning rate to an initial value;
   storing an input layer training pattern and an output layer training pattern;
   processing the input layer training pattern in the neural network to obtain an output pattern;
   calculating an error between the output layer training pattern and the output pattern;
   if at least two output patterns have been obtained, calculating a new value for the adaptive learning rate, further comprising:
      calculating an error ratio to determine the change in error between training iterations;
      if the error ratio is less than a threshold value, multiplying the adaptive learning rate by a step-up factor; and
      if the error ratio is greater than the threshold value, multiplying the adaptive learning rate by a step-down factor; and
   if a final trained state is achieved, deploying the neural network, otherwise, repeating steps (d)–(f) for as many iterations as necessary to reach the final trained state.

2. The method of claim 1, further comprising the step of adjusting the values of the one or more weights based on the error calculated in step (e) and the value of the adaptive learning rate.

3. The method of claim 2, wherein said step of adjusting the values of the one or more weights further comprises adjusting the value of the one or more weights such that the error ratio can exceed the threshold value.

4. The method of claim 2, wherein the adaptive learning rate and the one or more weights are adjusted in real-time.

5. The method of claim 1, wherein said error ratio is equal to the ratio of the error of the current processing iteration to the error of an immediately preceding processing iteration.

6. The method of claim 1, further comprising the step of selecting said input layer training pattern and said output layer training pattern with a combination clustering and adaptive representative data selection technique.

7. The method of claim 1, further comprising the step of automatically optimizing the neural network size as the neural network is trained by adaptively adding nodes and layers as needed to maintain the neural network complexity.

8. In a deployed neural network having an input layer and an output layer, a method for training the deployed neural network prior to deployment comprising the steps of:
   initializing the neural network with one or more weights of random value;
   setting an adaptive learning rate to an initial value;
   storing an input layer training pattern and an output layer training pattern;
   processing the input layer training pattern in the neural network using a gradient descent training algorithm with the adaptive learning rate to obtain an output pattern;
   calculating an error between the output layer training pattern and the output pattern;
   if at least two output patterns have been obtained, adjusting the adaptive learning rate based on the change in error between iterations;
   if the adaptive learning rate equals a reset threshold, reprocessing the input layer training pattern as in step (d), further comprising:
      setting the adaptive learning rate to a new initial value;
      generating a plurality of prospective neural networks;
      initializing each of the plurality of prospective neural networks with a different only one set of weights from a plurality of sets of weights; and
      processing the training pattern in each of the plurality of prospective neural networks for a preset number of iterations using the gradient descent training algorithm with the new value for the adaptive learning rate to determine if the error decreases;
   replacing the neural network with a most accurate of said each of the plurality of prospective neural networks;
   if the adaptive learning again equals the reset threshold, then, if steps (g) and (h) have occurred a preset number of times, assigning new random values to the one or more weights to reinitialize the neural network and repeating steps (b)–(i), otherwise, increasing the number of said prospective neural networks and repeating steps (g) and (h); and if a final trained state is achieved, deploying the neural network, otherwise, repeating steps (d)–(i) for as many iterations as necessary to reach the final trained state.

9. The method of claim 8, wherein step (f) further comprises calculating a new value for the adaptive learning rate, comprising the steps of calculating an error ratio to determine the change in error between training iterations;

if the error ratio is less than a threshold value, multiplying the adaptive learning rate by a step-up factor; and if the error ratio is greater than the threshold value, multiplying the adaptive learning rate by a step-down factor.

10. The method of claim 8, wherein the plurality of sets of weights in step (g) is created by adding a small random change to the current values of the one or more weights such that each set of weights in said plurality of weights is different.

11. The method of claim 10, wherein the adaptive learning rate and the one or more weights are adjusted in real-time.

12. The method of claim 10, wherein said small random change are sampled from a zero-mean, small-variance, multi-variate gaussian distribution.

13. The method of claim 12, wherein said zero-mean, small-variance, multi-variate gaussian distribution is a wider distribution for each subsequent increase in the number of said prospective neural networks in step (i).

14. A method for optimizing during training the architecture of a deployed neural network prior to deployment, the deployed neural network having an input layer, an output layer, and at least one intermediate hidden layer, and wherein each layer contains at least one node, comprising the steps of:

initializing the neural network with one or more weights of random value;

training the neural network with a training algorithm;

if the training algorithm cannot achieve a preset error goal, increasing the size of the artificial neural network to decrease prediction error, further comprising:

adding a plurality of new intermediate hidden layers if a threshold number of new nodes have already been added to one or more of the at least one intermediate hidden layers;

if a threshold number of new nodes have not been added to the at least one intermediate hidden layers, adding a plurality of new nodes to one of the at least one intermediate hidden layers;

repeating step (b) from the pre-addition state after each plurality of new nodes or the plurality of new intermediate hidden layers is added to determine which of the plurality of new nodes or which of the plurality of new intermediate hidden layers provided the greatest error decrease;

eliminating all others of the plurality of new nodes or the plurality of new intermediate hidden layers added except for the one new node or new intermediate hidden layer that provided the greatest error decrease;

if a final error goal is not achieved, repeating steps (b)–(e) from the pre-elimination stage for as many iterations as necessary to achieve the final error goal; and deploying the neural network.

15. The method of claim 14, further comprising the step of adjusting the values of the one or more weights after each new node or each new intermediate hidden layer is added to normalize the inputs throughout the artificial neural network.

16. The method of claim 14, wherein step (c) further comprises adding the plurality of new nodes to the smallest intermediate hidden layer.

17. The method of claim 16, further comprising, in the case of a tie for smallest intermediate hidden layer, adding the plurality of new nodes to the smallest intermediate hidden layer closest to the input layer.

18. The method of claim 14, wherein step (c) further comprises adding the plurality of intermediate hidden layers immediately before the output layer.

19. The method of claim 14, wherein the training algorithm has an adaptive learning rate.

20. The method of claim 14, wherein the training algorithm comprises a hybrid training algorithm further comprised of aspects of both gradient descent and stochastic artificial neural network training techniques.

* * * * *